Patented May 15, 1945

2,375,780

UNITED STATES PATENT OFFICE 2,375,780

METHODS OF MAKING PHTHALOCYANINE PIGMENTS

Vito A. Giambalvo, Rahway, N. J., assignor to Interchemical Corporation, New York, N. Y., a corporation of Ohio No Drawing. Application September 23, 1942, Serial No. 459,439

6 Claims. (Cl. 260—314.5)

This invention relates to the production of the blue to green pigments of the copper phthalocyanine class, and aims to provide a simple, inexpensive method of preparing such pigments characterized by low cost and ease of operation.

Copper phthalocyanine blue is conventionally prepared from copper, phthalic anhydride and ammonia as the basic raw materials; the green is prepared by substituting chlorine in the benzene nucleus. The blue was first prepared by de Diesbach and Von der Wied (Helvetica Chemica Acta 10—1927—p. 886 et seq.) from phthalonitrile and a copper salt in pyridine, and from o-brom benzene and copper cyanide under pressure; the first commercial attempts to produce the product appear to have been made by reacting phthalic anhydride or phthalimide, ammonia gas and metal (Dandridge et al.—British Patent No. 322,169). Because of the low yields obtained (of the order of 5 to 10%) the art soon went over to a two-stage process, in which phthalonitrile was first obtained from phthalic anhydride and ammonia by progressive dehydration, and the phthalonitrile was then reacted with a metallic compound. The cost involved in separating and purifying the nitrile, however, kept interest alive in a one-stage process. Such a process was made commercially feasible by conducting the reaction between phthalic anhydride, ammonia and copper in molten urea; yields of the order of 25% of theory are obtained in this fashion. The yields obtainable by this method have been further improved by the use of catalysts.

I have discovered that copper and similar metallic phthalocyanine blues and greens may be prepared directly from phthalic anhydride (or other starting materials capable of producing an ortho-arylene dinitrile by dehydration and reaction with ammonia), ammonia, and the copper (or other metal) salt of cyanuric acid in a simple, fast reaction, in yields of the order of 50 to 60% and higher of theoretical, without the use of catalysts.

As my basic raw material, I prefer to use phthalic anhydride or phthalimid, because they are available on the market in quantity at low costs. However, substantially any aromatic compound containing two ortho-carboxylic or nitrile substituents (for example, phthalic acid, its mono- or di-ammonium salt, the diamide, o-cyano-benzoic acid, or its derivatives, etc.) will yield phthalonitrile by dehydration and reaction with ammonia, and thus can be used. For the green pigments, the proper nuclear substituted equivalents are employed.

The copper or other metal can be added in any form which will react with cyanuric acid, provided sufficient cyanuric acid is present to form the metal cyanurate. I have observed improved results with small amounts of cyanuric acid, as compared with the reaction in its absence; but the yields increase in a comparatively linear fashion until enough cyanuric acid is present to theoretically produce the metal salt. From then on, further additions of cyanuric acid do not produce any increase in yield.

The reaction may be carried out in the presence or absence of inert diluents to dampen the exothermic reaction. Excess phthalimide is a very satisfactory diluent, but other carriers, such as urea, naphthalene and sodium sulfate, may be used. Known catalysts may likewise be added.

The following are typical examples of my invention:

*Example 1*

14.7 grams of phthalimide, 13.0 grams of cyanuric acid and 4.7 grams of cupric chloride dihydrate are thoroughly dry mixed and heated with good agitation at 225–230° C. for one hour. The reaction product is cooled, pulverized and leached with 400 cc. of 5% boiling NaOH. The excess phthalimide and cyanuric acid are recoverable from the leach liquid. The dry leached blue is dissolved in 10 parts of concentrated sulfuric acid, and then drowned in 100 parts of boiling water, filtered, washed and dried.

Yield—7.5 grams of copper phthalocyanine
=52.8% of theory.

*Example 2*

13.0 grams of C. P. cyanuric acid are dissolved in 1000 cc. of 2.0% ammonium hydroxide, and copper ammonium sulfate is added to excess. The bluish pink precipitate is filtered, washed and dried. The copper ammonium cyanurate thus formed is dry mixed with 14.7 grams of phthalimide and a trace of cupric chloride. The dry mixture is heated at 225–230° C. for one hour on a sand bath. The reaction product is cooled, pulverized and leached with boiling NaOH. The dry leached blue is dissolved in 10 parts of concentrated $H_2SO_4$ and then drowned in 100 parts of boiling water, filtered, washed and dried.

Yield—8.5 grams
=59.0% of theory.

*Example 3*

14.8 pounds of phthalic anhydride, 13.0 pounds of cyanuric acid, and 4.7 pounds of cupric chloride dihydrate are thoroughly dry mixed and heated with good agitation to 200° C. Dry ammonia is passed through the reaction mass, and the temperature allowed to rise to 250° C. where it is kept for one hour.

The reaction mass is then worked up as in Example 1.

Yield—7.5 pounds.
=52.8% of theory.

Examples obviously can be multiplied indefinitely without departing from the scope of the invention, as defined in the claims. In particular, phthalic anhydride and phthalimide can be replaced by equivalent compounds, as outlined above; and copper can be replaced by metals, such as iron, cobalt, nickel, etc., which produce similar metallic products. Furthermore, nuclear substituted products, such as the greens obtained from the chlor-substituted phthalic anhydride, can be produced by my method.

I claim:

1. The method of producing a metallic phthalocyanine which comprises reacting by heat cyanuric acid and a metallic compound reactable therewith with a compound capable of producing an aromatic ortho-dinitrile by dehydration and reaction with ammonia.

2. The method of producing a metallic phthalocyanine in high yield which comprises reacting by heat a metal cyanurate with a compound capable of producing an aromatic ortho-dinitrile by dehydration and reaction with ammonia.

3. The method of producing copper phthalocyanine in high yield which comprises reacting by heat copper cyanurate with a compound capable of producing an aromatic ortho-dinitrile by dehydration and reaction with ammonia.

4. The method of producing copper phthalocyanine which comprises heat-reacting copper cyanurate with phthalimid.

5. The method of producing copper phthalocyanine which comprises heat-reacting copper cyanurate with phthalic anhydride and ammonia.

6. The method of producing copper phthalocyanine which comprises heat-reacting a compound capable of producing an aromatic ortho-dinitrile by dehydration and reaction with ammonia, with a copper compound capable of reacting with cyanuric acid, and sufficient cyanuric acid to substantially convert all the copper compound to copper cyanurate.

VITO A. GIAMBALVO.